Nov. 16, 1954   H. G. ATWOOD ET AL   2,694,641
FERMENTATION COMPOSITIONS AND DEVICES
Filed Nov. 3, 1950
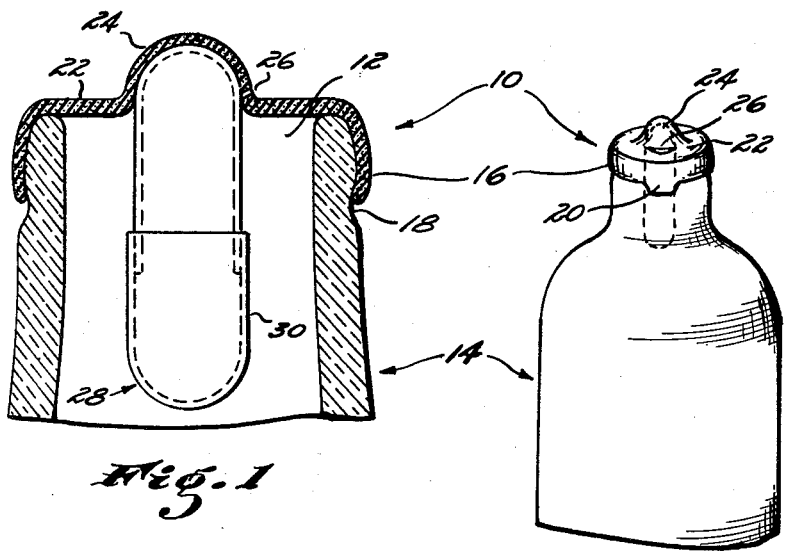
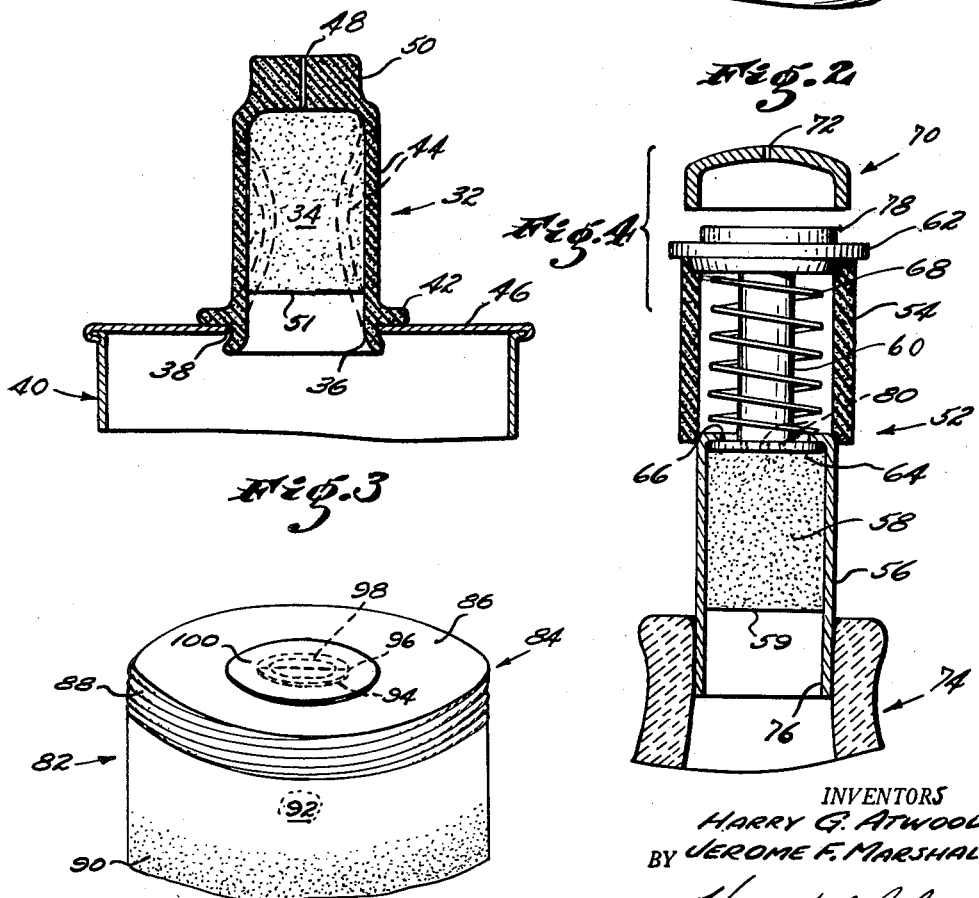
INVENTORS
HARRY G. ATWOOD
BY JEROME F. MARSHALL
Howard L. Johnson
ATTORNEY

United States Patent Office 2,694,641
Patented Nov. 16, 1954

2,694,641

FERMENTATION COMPOSITIONS AND DEVICES

Harry G. Atwood and Jerome F. Marshall,
Los Angeles, Calif.

Application November 3, 1950, Serial No. 193,844

20 Claims. (Cl. 99—78)

This invention relates to the production of products of enzymolysis adapted for human consumption such as fermented alcoholic beverages, and to self-fermentable mixtures, and to devices particularly adapted for home production of individual portions of such beverages or foods.

In the commercial production of beer, for example, other organisms than pure culture yeast enter the liquid at one stage or another. Since the final product contains residual nourishment and sugars upon which these organisms can propagate, if unrestrained they will produce "off" flavors and aroma. Consequently packaged beer is customarily pasteurized to eliminate such result. However this pasteurization at the same time causes a loss of fresh flavor and bouquet. Accordingly it is an object of the present invention to provide means for effecting a further fermentation of such pasteurized beer by the consumer, thus producing a fresh beverage of improved flavor and increased alcoholic content. Such drink is also simultaneously enriched in food and vitamin content by the treatment.

Another object of the invention is to provide means for a consumer to convert still wine to carbonated wine, and also to increase its alcohol content. Such treatment can likewise be applied to other liquids such as milk or fruit juice to provide a fortified, healthful beverage.

Still another purpose is to provide a composite container and/or container top bearing a quantity of self-fermentable material housed therein. Such container is provided with an automatic gas pressure release valve, generally in a removable cap. Accordingly with the cap mounted upon a container the fermentable material can be dropped into the body of liquid disposed within the container. The excess of carbon dioxide produced in fermentation, above a predetermined pressure, will be automatically vented through the valve. The cap and/or the self-fermentable material may be articles of commerce by themselves; after purchase they can be mounted on a container of liquid, or they can also be provided in association with their own container to which liquid is added by the consumer when he desires to proceed with the fermentation. The associated container can also carry (usually dry) foodstuff with which the fermentable mixture and liquid are thus mixed.

Yet another object is to provide a composite package or item of commerce consisting of an essentially empty container, having a gas release valve, and a portion of self-fermentable material stored therein. Such container devoid of liquid content can be shipped long distances without incurring the freight charges which necessarily accompany transporting a considerable volume of water or other liquid. At the point of destination pure water can then be added to the container and the stored material allowed to ferment therein, thus producing a fresh and palatable drink in a comparatively short time.

The quantity of fermentable material used is generally determined by the liquid capacity of the container and the final alcoholic content desired, and with this in mind different size caps and varied quantities of fermentable material are provided for use with various size containers.

A more general purpose of the invention is the novel production of alcoholic fermentation or other enzymatic action in desired liquid media by means of the addition of self-contained, balanced mixture of ingredients. Such mixture, preferably provided in a pellet or capsule form, need not contain living yeast and consequently is capable of retaining its potency during storage for an indefinite length of time. In addition, various special-purpose additives can be included in the mixture to adapt it to such objects as the production of sugar-free beer for diabetic persons or of vitamin-enriched beverages, or of beverages reinforced with food-digestive enzymes, etc.

Yet another feature is the inclusion in such compositions of self-clarifying components which act to coagulate and hold together solid fermentation products in the liquid; advantageously such components, typified by hydrophilic colloids such as gelatin are used to provide a sheath or capsule for the dry composition during its storage period.

Still another feature is the provision of a container provided with a gas release valve, a quantity of enzyme and fermentable substrate, and dry storage-stable foodstuff separated therefrom within the container and within which the enzyme is adapted to react after introduction of water or liquid by the consumer. Such foodstuffs may be exemplified by dried eggs (for production of an omelette after enzymolysis), flour (for use in baking or frying after enzymolysis), and dried meat (for use in cooking after enzymolysis).

It is within the province of the disclosure to improve generally and to enhance the utility of devices of that type to which the invention appertains.

With the above and other objects in view, which will appear as the description proceeds, the invention resides in the combination and arrangement of ingredients and parts and in the details of construction and operation hereinafter described and claimed, it being understood that changes in the precise embodiment of the invention herein disclosed may be made within the scope of what is claimed.

In the drawings, which form part of the present specification:

Figure 1 is a vertical sectional view taken through one embodiment of deformable closure shown mounted on the mouth of a container with a pellet of fermentable material seen in said elevation attached to the underface of the closure from which it may be dropped into the container.

Figure 2 is a perspective view of the closure and pellet of Figure 1 seen in place on the mouth of a container.

Figure 3 is a vertical sectional view taken through another form of deformable closure which contains fermentable material within the closure, here shown mounted across an opening in a can-type container.

Figure 4 is a vertical sectional view taken through still another form of closure which contains a plunger for ejecting the fermentable material through the mouth of a container across which it is mounted.

Figure 5 is a perspective view from above of still another form of container and closure embodying our invention and particularly illustrating a composite unit which is adapted to be distributed in commerce partly filled with dry, finely divided foodstuff so that when ready to use it, the consumer can fill it with liquid and mix the enzymatic material and foodstuff therewith by shaking the container before setting it aside to ferment.

In brief our invention is based in part upon the provision of a balanced mixture of ferment and substrate which will support a desired fermentation when mixed with liquid. Desirably a measured quantity of this self-fermenting mixture is pressed into a pellet or tablet for ease in handling and can also be encased in a capsule for storage. At the same time, with or without a protective sheath, it can be lodged in a dispenser-housing such as the hereafter described closure members in measured amount. Thus a cap adapted to fit a container of a certain volume will carry a quantity of fermentable material calculated to react in that volume of liquid and/or other material so as to produce a predetermined amount of alcohol or other desired product of enzymolysis.

The invention will first be illustrated by reference to the employment of yeast or the enzymes thereof in the production of beverages, then to their use in fermenting other foodstuffs such as flour, and then to the use of proteolytic enzymes in acting on meat according to our process.

As is recognized, alcoholic fermentation takes place in a liquid medium containing yeast and a hydrolysable substrate. Yeast belongs to the subdivision of the Ascomycetes and has the faculty of producing endogenous spores in an ascus, the spores being termed ascospores. It also has a vegetative reproduction by budding. It functions in fermentation by enzymatic splitting of sugar into alcohol, carbonic acid gas, and some other products such as succinic acid and glycerine in small quantities. *Saccharomyces cerevisiae* cells form the chief constituent of beer yeast, wine yeast and pressed yeast as well as distillery or high alcohol producing yeast. When the term yeast is used it is meant to include both top and bottom fermenting cells as applied to brewery yeast as well as high attenuating and low attenuating yeasts, fast attenuating or slow attenuating yeasts. In general the term yeast also includes all fermentation organisms although varying in their behavior to various sugars, and particularly includes yeast in either a pure culture state or mixed culture of yeasts with other organisms such as lactic or acetic acid associated organisms which the preponderance of yeast cultures may have through infection. In some instances we may use *S. ellipsoideus* or *S. pastorianus* to obtain certain flavors, or a mixture of these yeasts regardless of their spore forming classification, or *S. apiculatus* (a budding fungus which does not form endospores) in slight amounts in order to produce a certain bouquet substance such as a fruit ether. Generally however one starts with a selected pure yeast culture obtained from a single cell which is known to produce a high amount of alcohol in a short length of time.

Enzymes are catalysts found in living matter with specific powers of reaction independent of the latter. They occur in animal and vegetable cells and carry on transformation work upon the organic substance in the presence of the living cell by breaking down the complex compounds into those of simpler structure. They are found in and produced by living organisms although they are not living in that they do not possess the powers of reproduction. These active enzyme substances are secreted by the living cells to facilitate the chemical assimilation and disassimilation of their foods.

Enzymes may be derived from animal or vegetable sources and act as definite material catalyzers of organic nature with specific powers of reaction formed by the living cells and independent of the latter in their operation. If a more or less diluted infusion of enzymes obtained from an animal, plant or vegetable source such as from yeast, bacteria, malt or pancreas is treated with alcohol or other precipitating agent, the precipitate exhibits all of the properites the liquid itself possessed. This concentrate then has great keeping powers. Proteolytic enzymes such as pepsin or peptase and trypsin or tryptase can be obtained, for example, from the stomach and pancreas of animals or from grain such as germinated barley or from the latex of the tropical plant *Carica papaya*. They digest proteids with great facility into proteoses and peptones and amides. Among the protecyltic enzymes are, pepsin (gastric juice), trypsin (pancreas), peptase and tryptase (malt), papain (papaya), endotrypsin (yeast) and galactase (milk). Meat tenderisers are composed mainly of papain and are recognized and used widely for the purpose of making cheap tough cuts of meat edible and tender. Melted milk powders contain malt enzymes for the purpose of affording invalids a source of easily digestible food. Enzymes may be mixed with viable organisms in the container top or with carbohydrate media for the purpose of conveniently handling and shipping a dried concentrated carbohydrate or protein material for an easily digested food or beverage.

Although alcohol-producing and proteolytic enzymes are principally described by way of illustration herein, it will be apparent that our container caps and/or capsules can be used to provide any desired enzymatic material to the substrate stored or added to the container.

Now yeast contains an enzyme termed zymase which is the actual agent which converts sugar into alcohol. It is possible to obtain or concentrate this fermenting agent from the yeast cells and introduce it into a sugar-containing medium so as to produce an alcoholic fermentation without the living yeast. The product is a white power in which the yeast cells are dead and which therefore cannot grow and reproduce itself. The sugar fermenting enzyme is however active, being apparently more or less released from the cells by the treatment, and the dried powder will keep for years without substantial deterioration and will when later placed in a suitable sugar solution induce a vigorous alcoholic fermentation. The following are typical methods for preparation of the powder.

*Method #1*

Approximately 500 grams yeast is added to 3 litres acetone and after 10 minutes the mass is filtered. The yeast is again treated for 2 minutes with acetone and filtered; the residue yeast mass is then mixed with 250 cc. ether for 3 minutes, filtered, and dried for 24 hours at 45 C.

*Method #2*

The least is treated with dilute solutions of sulphuric acid (0.1 to 0.5%) of formaldehyde, sodium or ammonium fluoride, ferrous sulphate, ammonium oxalate, potassium chlorate, ether and chloroform. The residue is washed after 5–10 minutes and the residue dried.

The zymase can also be separated from the yeast and used as herein described, by killing the yeast with a chemical, or drying it at temperatures which kill the yeast but not the zymase. For example yeast dried at 100 F. is still capable of alcoholic fermentation; although less than all of the cell life may be destroyed, the possible exceptions do not reproduce normally. If this dried yeast is further dried at 212° F. for a period of 6 to 8 hours no living yeast remains, although the zymase retains its full potency as it is more resistant to heat. This dried non-viable yeast powder then can be used in place of living yeast for fermentation or in combination with living yeast in minimum amounts for the purpose of reducing the yeast sediment, as the few living yeast cells plus the excess zymase will complete the fermentation of the sugar at a rapid rate with minimum cell reproduction. The purpose of either using the dried zymase separately or with a few living cells of yeast is to eliminate to a greater degree the deposit which detracts from the eye appeal to the user. The most desirable way to eliminate the deposit is to use the evaporated powder obtained from the concentrated yeast sap as follows: One pound of fresh yeast is ground with water for one hour, after which approximately 300 cc. of cell sap is expressed by hydraulic pressure and reserved. The residue is again ground with 300 cc. water and expressed until a total of 500 cc. cell sap is obtained. One liter of absolute alcohol is added and the precipitate removed by filtration and reserved. This residue is then evaporated at 86° F. and the concentrate desiccated and powdered, yielding approximately 50 grams of zymase powder. This product is very soluble, very potent and has great keeping power. Its use in a capsule containing carbohydrates, or in the container top acting as a carrier, is preferable to the use of viable yeast for a miniature fermentation. Desirably the air is excluded from the yeast during treatment since in the presence of oxygen the peptase enzyme will gradually destroy the zymase power before drying. The peptase is destroyed by heating during the drying operation. Bottom brewery yeast is the best source of zymase.

Accordingly the term zymase as hereafter used includes any culture of living or dead yeast having fermentation powers and therefore containing zymase. The term dry zymase is used to include non-living yeast which contains zymase available for fermentation.

Preferably the substarte for use with yeast is predominantly the most easily fermentable material, namely sugar in its generic sense. This may be mono- or poly-saccharides, cane or beet sugar, honey, molasses, or even material which can be hydrolysed to sugar such as glucosides, starch, etc.

Cane sugar or sucrose is the most familiar substance in the group of disaccharides or saccharoses which sugar is first converted into glucose and fructose by the enzyme invertase contained in yeast. Since there is a marked difference between the physical structures found in the carbohydrates, they may be grouped under these two main divisions; those which are diffusible such as crystalloids or sugars, and those which are not diffusible such as colloids or starch and gums. Like many other classifications this division is not absolute as there exist carbohydrates which are on the border line, being difficult but not impossible to diffuse. Cane sugar or sucrose is the most familiar substance in this diffusible group, being first hydrolized into directly fermentable sugars such as glucose and fructose by the action of the yeast enzymes. One hundred parts of sugar yield on inversion one hundred and five parts of invert sugar so that making allowance for the by-products, fifty one percent of the weight of the sugar is converted into alcohol. Such diffusible carbohydrates form a preferred substrate. When starch is included, there is also added a starch converting enzyme such as diastase which breaks down the starch into sugar.

The present invention will now be particularly exemplified by reference to the fermentation and refermentation of beer. The percent alcohol in beer is designated by weight and in distilled liquors by volume. Between 1 and 10% of alcohol, the per cent by volume is 1¼ the per cent by weight; or conversely the per cent by weight is ⅘ the per cent by volume.

Every per cent sugar yields about a half per cent of alcohol by fermentation, therefore for every pound of sugar there will be half a pound of alcohol which is equal to a pound of proof spirits.

The actual yield of alcohol from one pound of sugar is about 0.35 gallon absolute alcohol or about one ounce of 100 proof (i. e. 50%) alcohol from one ounce (28.35 g.) of sugar. Thus the usual 12 ounce container of packaged beer contains 4% or approximately one proof ounce of alcohol. This was originally produced from one ounce of sugar. Accordingly to increase the alcohol content to 6%, one would add ½ ounce of sugar.

Aside from the thirst appealing qualities, beer has considerable nutritional value as expressed in the average of present day beer analyses.

| Substance: | Approximate percentage |
|---|---|
| Water | 93.2 |
| Alcohol | 3.0 |
| Carbon dioxide | 0.4 |
| Carbohydrates | 3.0 |
| Proteins | 0.3 |
| Minerals | 0.1 |

In addition to this there are a number of important vitamins of the B complex such as riboflavin, nicotinic acid, pantothenic acid, and pyridoxin. These vitamins are in a relatively concentrated amount when compared with their normal distribution. The carbohydrates are mainly unfermentable dextrins, the minerals consisting of the phosphates and chlorides of calcium, iron, potassium, sodium and other elements present in traces. Both the proteins and the carbohydrates in a digested form are easily assimilated.

With each ounce of sugar there is added about ½ to one gram of yeast or zymase. When living yeast is used, about ¼ to ½ g. of soluble proteinaceous material is also included to provide nourishment for the yeast, although when refermenting previously fermented beverage this is not usually necessary. In starting with plain water or with a soft drink however it is desirable to include it.

The substances applicable for yeast nutrition are nitrogenous substances of two groups: the albuminoids or their immediate derivatives, and the amides or amido substances. Yeast can only use those soluble nitrogenous compounds present in solution with it, such as amides including asparagin which easily permeate the yeast cell. During fermentation approximately one third of the albuminoids, peptones, etc. are used up, therefore upon refermentation there remains ample nourishment for the yeast in the beer or wine. The fermentation of soft drinks requires the addition of soluble nitrogen compounds as there are only traces of this material generally found in bottled products.

A large number of substances occurring in animal and vegetable matter are included under the term proteids or albuminoids and contain the elements nitrogen and sulphur in addition to carbon, hydrogen and oxygen. They form the starch converting or natural saccharifying agents and the yeast nourishing or fermentation supporting material when modified into peptones by the action of the enzyme peptase and are then capable of diffusing through the cell membrane of yeast. Unmodified albumen is not capable of diffusing through the yeast cell membrane; therefore proteins that are soluble in pure water are termed albumins, the further conversion products being albumoses, peptones and amides. Although asparagin is not cited amongst the conversion products it will be understood that it acts as a stimulating agent for fermentation and is to be included, among those affording nitrogenous nutrient for yeast.

In review, the products of protein breakdown resembles that of starch in that it takes place in stages successively yielding products of greater simplicity containing fewer amino acids. These groups given in order of decreasing complexity as they would be encountered in protein degradation are albuminoids, peptones, amide and amido acids.

When the average beer is refermented by our process the enzyme and vitamin content can be increased up to seven fold. For diabetics the residual carbohydrates in the form of unfermentable dextrins may through the use of an added enzyme dextrinase be changed into a fermentable sugar and alcohol, thereby affording a sugar-free beer acceptable to diabetics. Generally a quantity equal to or less than that of the yeast is adequate. Other enzymes such as protease may also be added to the mixture for refermentation, thus making the beer or soft drink a potent digestive agent for proteins. If a starch degrading enzyme such as diastase is added, starch products are also easily digested. A combination of such enzymes accordingly affords the drinker not only a palatable and intoxicating beverage of substantial food value but also one which carries on their respective functions in the digestive tract of the drinker, particularly when consumed together with a meal. Such quantities of enzymes and vitamins could not be contained in packaged beer heretofore as the necessary pasteurization temperature (135–140 F.) tends to destroy them. One pint of beer as found on the market today contains approximately one fifth of the daily requirements of both riboflavin and nictoinic acid. By the use of our process then, the full necessary daily requirements are obtained in one pint of beverage. This is particularly valuable with respect to riboflavin which is not well distributed among foodstuffs.

Due to the alcohol content and to certain substances set free by the activity of the yeast, the fermented mixture acts destructively upon disease-exciting germs. The experiments of H. Zikes with cholera and typhus bacilli (Mitteilungen der osterreichischen Versuchsanstalt für Brauerei and Malzerei, Vienna, 1903) indicate that in sterilized beer, almost deprived of its content of alcohol and carbonic acid, cholera germs lived at a temperature of 98° F. six days; at a temperature of 50° F. they lived three days. In fresh beer (not pasteurized) at a temperature of 98° F. they died in ten minutes; at 77° F. and at 50° F. in 25 minutes. At 98° F. the typhus bacilli lived fifteen minutes; at 77° F. and 50° F. five minutes. These tests demonstrated the effect of ordinary ripe beer in combatting cholera and typhus germs. The fact deserves the widest notice especially among medical and hygienic authorities. Freshly fermented beverages are a fairly safe means for quenching thirst without undue exposure to infection. This is not true to the same degree with water, milk, or effervescent acid drinks, altho the slight fermentation which takes place in certain beverages prepared from milk such as Kefir and Mazum affords considerable protection. Acid drinks such as lemonade which contain a certain amount of organic acids act as germ destroyers, but carbonic acid alone works slowly.

Particularly when producing beer from plain water, there is also added about ¼ to ½ g. of hop oil. When it is not desired to obtain a beer taste, other essential oils or flavoring matter may be included in place of the hop oil. Compound ethers, also termed fruit ethers and fruit oils, are chemical compounds obtained by etherification and are divided into two classes, one the oxides of the alcohol radicals and the other compounds of these ethers and alcohols with inorganic and organic acids. Of the first class butyric ether is a good example and of the second, nitrous ether. Single or several compounds (compound ethers) present a distinct fruit flavor and are therefore called fruit ethers and erroneously termed fruit oils. The solution of these ethers in alcohol are the artificial fruit essences.

Extracts are various preparations obtained by removing from crude botanicals a solution of their essential principles and more or less evaporating to dryness. This may be done from the fresh or dried drugs with various liquids such as water, alcohol, ether, glycerine, etc. forming hydro-alcoholic, alcoholic, or ethereal extracts. An aqueous extract is formed by boiling or percolating the substance and evaporating to the desired consistency. Alcoholic extracts are made with strong or weak alcohol solutions upon the ground material by percolation, the alcohol being distilled off from the whole of the tincture and the residue then evaporated to the desired consistency. An essence is a solution of volatile oils in alcohol in varying proportions while a tincture is a diluted solution of partially volatile products in liquids other than water and glycerine. These fluid extracts when prepared with highly concentrated spirits separate part of their extractive matter or dissolved oils in the cold and particularly when dissolved in carbonated waters, causing a sepaartion in flakes or a milky appearance. The avoidance of this and other problems in the manufacture of soft drinks in the past required experienced manipulation and specialized knowledge, while with the present process these flavorings and bouquet substances are added to the sugar when the medium is prepared and subsequently automatically blended during fermentation and incorporated with the nascent carbon dioxide gas produced.

Among the oils suitable for soft drinks are: anise, birch, almond, citrus, coffee, cloves, cocoa, coriander, ginger, hops, juniper, horehound, lavender, liquorice, malt, nutmeg, peppermint, spearmint, rose, root-beer, sarsaparilla, tonka, cola nut, vanilla, wintergreen, etc.

Other less frequently used flavors include: ambergris, angostura, beef, tea, peach, capsicum, caffeine, cassia, celery, cardamom, chocolate, fennel, geranium, mead, melissa, musk, neroli, orange flower water, pistachio, pineapple, essence of rum, cognac, arrac, gin, whiskey such as rye and bourbon, pimento, spruce, coumarin, wine essence.

Flavoring matter can also be derived from fruits, merely by evaporating to dryness if desired. Fruit juices are obtained from blackberries, strawberries, raspberries, cherries, currants, bilberries, gooseberries, mulberries, grapes, pineapples, limes, lemons and oranges which are termed juicy fruits. The non-juicy fruits are apples, pears, peaches, quinces, apricots and plums.

The agreeable aroma of the fruit juices are enhanced by the addition of small quantities of acetic ether or some of the fruit essences such as: aldehydes, amyl alcohol, amyl acetate, amyl butyrate, amyl valerianate, chloroform, ethyl acetate, ethyl benzoate, ethyl butyrate, ethyl formate, ethyl nitrate, ethyl oenanthate, ethyl sebacate, ethyl valerianate, methyl salicylate, benzoic acid, oxalic acid, succinic acid.

In addition it is often desirable to include about ¼ to ½ ounce of dextrin to mask the taste of the raw alcohol. In general the fermentation of such a mixture requires a minimum of about 60 hours at 90° F. or up to 10 days at about 40° F. A constant time need not be maintained but, as is evident, such enzymatic reactions generally proceed faster at an elevated temperature which for yeast can be up to about 100° F. or more. Also as noted earlier, an elevated temperature of the fermentation mixture accelerates the destruction of pathogenic organisms, which is of special value in tropical countries and other regions of uncertain water purity.

Desirably the dry mixture is provided encased in a protective sheath of hydrophiluic colloidal material or similar substances such as tasteless and odorless dried glue products such as casein. When this capsule is subsequently dropped into liquid it dissolves to release the fermentable mixture. Such vegetable glue products or animal gelatin have the property when dissolved to carry down turbid material which may remain in suspension, in the fermented product. Non-toxic mineral jels such as aluminum and/or silicon oxides can also be used. The action results in accelerating the clarification and holding the yeast and other solids at the bottom of the container so as not to require filtration. Isinglass obtained from the bladder of fish consists of a glue substance which also coagulates into a flocculent mass and forms a network carrying down the substances which make the beer turbid.

For comparison with the fermented beer obtained by our process, reference is again made to the current commercial pasteurization of packaged beer: On the average a temperature of 140° F. is held for 16 minutes for pint bottles and 9 minutes for quarts. This is the maximum temperature of pasteurization time and temperature, although the over all time in reaching this temperature and reducing it is approximately 30 minutes in all. Higher temperatures than this involves a "bread-like" taste and possible precipitation of albumen, etc. This process used in the bottling department for beer is to kill any yeast cells or other micro-organisms that may be contained in it or to weaken theeir vitality to such an extent as to render them inactive and thereby prevent any further fermentation or decomposition of the bottled beer which might otherwise have taken place. The diastatic enzymes which were active during the mashing of the grains for the purpose of solubilizing the nitrogenous bodies and starch into a strained or filtered wort were all destroyed during the boiling of the wort with the hops. The subsequent development of enzymes or vitamines by the yeast is thus considerably reduced and in the case of enzymes they are totally destroyed. Although it would be greatly to the advantage of the flavor and bouquet as well as the healthful qualities of the beer not to have this treatment, it will be understood that it is necessary for the shelf life and keeping qualities. We know of no other possible process except an aseptic pure yeast fermentation that would yield the desirable result that our process teaches, and the aseptic pure yeast fermentation or a sterile filtration after fermentation incurs too great a risk and outlay of capital to make it practical on a commercial basis.

Turning now to the structural features of the invention, as here illustrated in Figures 1, 2, there is provided a more or less cap-shaped closure member 10, formed of synthetic and/or natural rubber or other elastomeric material, so as to be stretchable over the mouth 12 of a bottle 14 or other container and thus snugly engage the outer periphery thereof. Preferably the lateral band portion 16 of the closure extends downward as far as the groove 18 of the bottle, which groove may have originally served as an anchor line for a metallic cap (not shown) often used to close beer bottles. A pair of diametrically opposite lips or extension tabs 20 may also be provided for ease in mounting and removing the closure.

Centrally located on the flat top 22 of the closure is an outwardly bowed, dome shaped protrusion 24 containing a transverse, normally closed slit 26 thru the side thereof. This slit serves as a release valve or vent for gas pressure built up by fermentation in the container. It is designed to open only in response to a predetermined quantity or pressure of gas inside the container and will close again when the internal pressure has fallen. Different pressures at which it will open are correlated for example, with the composition and thickness of the deformable material, etc.

Attached to the underface of the pocket formed by the dome 24, as by means of edible adhesive substance is a pellet 28 of the present fermentable material. Desirably the compacted material as noted earlier is enclosed within a capsule 30 of gelatine, agar, or other substance which will dissociate when dropped into the liquid of the container. Such capsule serves both as a protective coating for the pellet during shipping and storage, and also as a gummy base to hold the bottom of the container, sediment formed in the liquid during fermentation. The capsule may be formed of either one or two pieces, and adherence to the dome obtained by merely moistening the end of the gelatin capsule and pressing it against the rubber. Or the same may be done with the pellet in the absence of a capsule, the moistened compacted sugar of the fermentable mixture generally adhering to the rubber satisfactorily when pressed thereagainst with a small amount of force.

In the form illustrated in Figure 3, there is provided a closure member 32 the walls of which form a pocket completely enveloping the compacted fermentable material 34 except at the bottom outlet or lip edge 36 thereof. This form may be mounted either around the outside of a bottle neck (as in Figures 1–2) or may be inserted within an opening 38 of a beer can or other container 40. A pepipheral skirt 42 extends laterally outward from the side wall 44 a short distance back from the deformable lip 36, so that the closure can be pressed into the can opening 38 until the skirt 42 overlies the top 46 of the can about the opening and provides—together with the lip—a very tight seal therefor. At the opposite end of the closure, a slit-type gas release valve 48 is again provided, being formed in an axially restricted knob-like terminus 50 of the plug.

This form of closure is especially intended for use with a fermentable mixture in the absence of a protective capsule, the sugar and other ingredients being packed directly into the pocket or cavity formed by the side walls 44. Accordingly when the closure is mounted across the container opening (38) the fermentable mixture 34 can be loosened and caused to drop into the container by pressing together or "kneading" the opposite deformable walls 44 between the fingers of the user. If desired, a sealing disk 51 can be pressed against the material 34 to close the pocket. When made of the hydrophilic material earlier mentioned, it will readily crumble when the sides 44 are kneaded, so as to drop into the container along with the fermentable material.

In the embodiment illustrated in Figure 4, there is provided a multi-part closure 52 which relies on a spring loaded plunger instead of flexing of deformable walls to discharge the fermentable material into a liquid container. It is formed with an outer tubular housing 54 open at the bottom for reciprocal movement therein of a cylindrical hollow shell 56, forming a pocket within which the fermentable mixture 58 is packed. A hollow piston rod 60 is fixedly secured at one end to the top 62 of the housing and carries on its other end a plunger plate 64 which is disposed within the shell 56. The upper face of the plate is adapted to frictionally engage the under surface of an inwardly projecting flange 66 formed about the upper edge of the shell, the two being normally held in abutment by means of a helical expansion spring 68 disposed about the piston rod, and bearing respectively against the flange 66 and the under side of the housing top 62. A sealing disk 59 may also be pressed into the shell 56.

A cap 70 is provided with a gas release valve 72 in the top thereof. When the unit 52 is not mounted on a container 74, the cap serves as a closure for the open or deformable end 76 of the shell 56. When the shell is mounted across a container mouth, the cap can be placed on the opposite end thereof, pressed down about the shoulder 78. When the shell opening 76 is aligned with a container mouth, the housing 54 is pressed down, thus causing the plunger plate 64 to eject the fermentable material 58 into the container. Escape of gas may subsequently be effected through the plate perforations 80, thence through the hollow piston rod 60 and out the vent 72. In the event that the neck of the container (74) is small enough to fit inside the shell 56, the fermentable mixture can be discharged in this position and then the unit 52 removed and the cap 70 mounted directly upon the mouth of the container to provide a relief valve.

In addition to providing the present combination of a closure containing within itself an ejectable quantity of fermentable material for incorporation into containers of alcoholic or non-alcoholic beverages, there is also provided a unit consisting of an empty container carrying such a closure with a measured amount of dry fermentable material. Such a unit can be shipped cheaply for long distances because of its light weight and then pure water (or other liquid) added to it to obtain fermentation at the final destination. In addition to excluding foreign matter by our closure members on the container of fermenting material, it should also be noted that during fermentation our closures promote the enzymatic reaction by maintaining a positive pressure of carbon dioxide on the liquid therein.

Thus during recent times, considerable quantities of bottled or canned beer, for example, have been shipped great distances across oceans and to other continents to supply personnel stationed there. This has greatly taxed shipping capacity especially during wartime and was particularly vexing when it was appreciated that the overwhelming bulk of the beverage consisted of water which could be distilled or otherwise procured at the destination, even tho there might not be a brewery there to utilize it.

Now by the present invention, the dry containers 14 can be shipped, together with a closure (10, 32 or 52) having such a quantity of self-fermentable material stored therein as is adapted to the volume of the container. Later, after arrival, the empty container is filled with water or other liquid, the fermentable material dropped therein, and the whole set aside to ferment.

Further, such procedure is not limited to shipping an otherwise "empty" container but the same can be utilized to carry or store any needed material, especially powdered or granular substances, and notably foodstuff. Thus the container can pass in commerce filled (aside from the closure cavity) with such articles as flour, sugar, cocoa, powdered milk or eggs, salt, spice, coffee, tea, gelatin, starch, rice, wheat, oats, corn, barley or other grains. In such a composite article or package, it should be noted that the capsule or sheath 28 surrounding the fermentable material acts as well to prevent its contamination with the bulk of the other substance carried in the container. After the latter is used up or emptied out, the container is filled with liquid and the capsule is dropped in to ferment as earlier described. In addition, since the fermentable mixture is predominantly sugar, it can be eaten as an emergency ration instead of fermenting it.

Of course the material stored in the container need not be limited to powdered or granular substances but these are particularly mentioned because of the ease of emptying them from a bottle or can having a small orifice. Likewise such material need not be restricted to foodstuffs since after the contents (e. g. medicine, tobacco, soap, etc.) are emptied the inside of the container can be thoroughly cleaned before being used for fermentation.

Again, the material in the body of the container need not be limited to dry substances but liquids (e. g. fruit juice, soup, condensed milk, etc.) can be distributed therein as long as the sealing disk 51, 59 or capsule 28 is resistant to such liquid or else the fermentable material is otherwise segregated. Thus the disk 51, 59 can be of metal foil or paraffin coated- or impregnated-cardboard, etc. In such case it is generally removed from the pocket with a knife tip before the fermentable material is ejected into liquid to be fermented.

In the construction illustrated in Figure 5, there is provided a generally cylindrical container 82 which may be formed of metal or other more or less rigid material, the top end 84 of which is open and provided with a closure 86 mounted over the whole end by suitable engaging means such as screw threads conveniently located about the inner face of an outer cylindrical lip 88. The feature of a non-restricted opening or mouth 84 is intended particularly for use with generally loosely packed, more or less solid, dry material 90 which incompletely fills the cavity 92 so that upon the container coming to its ultimate user, pure water (or other liquid) may be used to fill the cavity and the earlier described fermentable mixture then dropped in.

For this purpose, the cap or closure 86 is formed with a generally central opening across which is mounted a somewhat flexible rubber sheet 94 having a slit gas-relief valve 96 formed across the center similar to the valves 26, 48 and 72 of the prior forms. The capsule 98 of fermentable material earlier described is adhesively attached to its underface so that pressure upon the top surface of the rubber sheet will release the capsule and cause it to drop into the cavity 92. After the capsule has dissolved in the liquid, its contents can be mixed with the material 90, if desired, merely by shaking the closed container. In order to protect the sheet 94 against accidental discharge of the capsule during shipping and storage, there may be mounted (as by suitable adhesive) a flat protective disk 100 across the area of the sheet 94 and beyond the perimeter thereof in each direction. When it is desired to expose the rubber sheet and valve 96, this disk 100 is merely pried loose, as by the tip of a knife blade, and discarded.

This form of container is particularly applicable for dispensing powdered eggs, or flour, or chopped or powdered meat as the stored material 90. Thus the fermentation of powdered eggs prior to use in an omelette, in addition to the alcohol produced, yields a very agreeable flavor to the dish. About 1 oz. to 2 oz. yeast or zymase is used per pound of powdered eggs, enough water and/or milk being added to make a batter. Desirable fermentation time is about 4 to 8 hrs. at 25° C. The earlier mixture of sugar and yeast can also be used.

When flour is the stored material 90, the provision of a pure culture of yeast in the capsule 90 is of great advantage in making bread, pancakes, biscuits and the like. In addition, the container with its dry ingredients can be stored indefinitely at ordinary temperatures prior to the addition of water or milk at the time of use. This is in marked contrast to commercially obtainable yeast cultures or partially fermented dough products which must be stored under refrigeration and in addition may turn sour from time to time or become contaminated with other organisms. About 1 oz. to 2 oz. yeast or zymase is used per pound of flour with whatever amount of liquid desired. Adequate fermentation time is about 4 to 8 hrs. at 25° C. The previous mixture of sugar and yeast can likewise be used.

A particular advantage is obtained by packing meat as the material 90 since the many tough portions of meat which per se possess small economic value can be used. These are generally ground, or at least chopped, and then dried to reduce their moisture content to that of dried beef or less. By fermentation of the meat by proteolytic enzymes (earlier mentioned) contained in the capsule 98, the tough cuts are converted to tender, fresh-tasting material. Such can be used in hamburgers, stew, dressing, gravy, etc. About ⅛ oz. to ¼ oz. proteolytic enzyme such as papain is used per pound of meat. Only the minimum of liquid required to distribute the enzyme thru the mass so as to form a slurry need be added. Enzymolysis time is on the order of about ½ hr. to 2 hrs. at 25° C.

While we have herein shown and described our invention in what is conceived to be the most practical and preferred embodiments, it is recognized that departures may be made therefrom within the scope of the invention, which is not to be limited to the details disclosed herein, but is to be accorded the full scope of the claims so as to embrace any and all equivalent devices.

The invention claimed is:

1. A removable closure for a liquid container, comprising a closure means, an enclosure within the closure means, a discrete quantity of storage-stable enzyme and fermentable substrate releasably held in said enclosure, means comprising the lower portion of the closure for snugly engaging the mouth of a liquid container, and gas relief vent means carried by said closure, said closure being adapted to express the quantity of stored material from the removable closure.

2. The closure of claim 1 wherein said enzyme consists essentially of zymase.

3. The closure of claim 1 wherein said stored material is contained in a sheath of material dissociable in liquid and thence capable of coagulating fermentation residues.

4. The closure of claim 1 wherein said quantity of material is contained in a sheath of material dissociable in liquid.

5. The closure of claim 1 wherein said material consists of about 28.35 parts sugar
½ to 1 part yeast
¼ to ½ part soluble protein
¼ to ½ part flavoring matter
¼ to ½ part dextrin.

6. An article of commerce, comprising in combination a container adapted to hold liquid and having in association therewith, a removable closure which closure has means adapted to snugly engage the mouth of said container, gas pressure release means adapted to vent gas formed within the container by fermentation, and a quantity of substantially dry storage-stable material consisting essentially of zymase and fermentable substrate capable of fermentation within the container when liquid is mixed therewith.

7. A storage stable article of commerce comprising in combination a container adapted to hold liquid and being substantially devoid thereof, a removable closure for said container, gas pressure release means adapted to vent gas above a predetermined pressure which may be produced within the container by fermentation, and a substantially dry storage-stable mixture of fermentable substrate and enzyme capable of fermentation within the container when liquid is mixed therewith.

8. The article of claim 7 which contains a major amount of dried eggs within said container.

9. The article of claim 7 which contains a major amount of dried meat within said container.

10. The article of claim 7 which contains a major amount of flour within said container.

11. The article of claim 7 wherein said storage-stable mixture consists essentially of zymase and sugar in a ratio of approximately ½ g. to 1 g. zymase per ounce of sugar.

12. The article of claim 7 which contains a major amount of aqueous-dispersible carbohydrate.

13. A capsule of material dissociable in aqueous media and containing therein a substantially dry storage-stable mixture consisting essentially of an enzyme and fermentable substrate, said capsule material being adapted upon dissociation in liquid for clarifying said media by coagulating solid fermentation products.

14. The capsule of claim 13 which consists essentially of gelatin.

15. The capsule of claim 13 wherein said dry mixture additionally contains dextrinase.

16. The capsule of claim 13 wherein said dry mixture consists essentially of about 28.35 parts sugar
½ to 1 part enzyme.
¼ to ½ part flavoring matter.

17. The capsule of claim 13 wherein said dry mixture consists essentially of zymase and sugar in a ratio of approximately ½ g. to 1 g. zymase per ounce of sugar.

18. A removable closure for a liquid container, comprising a closure means, an enclosure within the closure means, a discrete quantity of storage-stable zymase and sugar releasably held in said enclosure in a ratio of approximately ½ g. to 1 g. zymase per ounce of sugar, means comprising the lower portion of the closure for snugly engaging the mouth of a liquid container, and gas relief vent means carried by said closure, said closure being adapted to express the quantity of stored material from the removable closure.

19. A process for producing a potable alcoholic beverage, said process consisting essentially of adding zymase and sugar in a ratio of approximately ½ g. to 1 g. zymase per ounce of sugar to an enclosed body of liquid incapable of independent fermentation, and maintaining said liquid closed to the atmosphere until a predetermined pressure of carbon dioxide is built up thereover by the fermenting mixture.

20. A process for producing a potable beverage of increased alcoholic content, said process consisting essentially of adding zymase and sugar in a ratio of approximately ½ g. to 1 g. zymase per ounce of sugar to a body of pasteurized packaged beer, and maintaining said beer closed to the atmosphere until a predetermined pressure of carbon dioxide is built up thereover by the fermenting mixture.

References Cited in the file of this patent

UNITED STATES PATENTS

| Number | Name | Date |
|---|---|---|
| 413,886 | Barnes | Oct. 29, 1889 |
| 413,944 | Hull | Oct. 29, 1889 |
| 1,247,678 | Hentschel | Nov. 27, 1917 |
| 1,420,557 | Klein | June 20, 1922 |
| 1,546,820 | Ballard et al. | July 21, 1925 |
| 1,583,038 | Weil | May 4, 1926 |
| 2,070,377 | Simmons | Feb. 9, 1937 |
| 2,073,273 | Wetstein | Mar. 9, 1937 |
| 2,162,455 | Hoge | June 13, 1939 |
| 2,275,567 | Smith | Mar. 10, 1942 |
| 2,404,763 | Gaver | July 23, 1946 |
| 2,495,942 | Nosik | Jan. 31, 1950 |
| 2,557,648 | Gerson | June 19, 1951 |